No. 844,589. PATENTED FEB. 19, 1907.
L. M. GILCHRIST.
NUT LOCK.
APPLICATION FILED APR. 23, 1906.
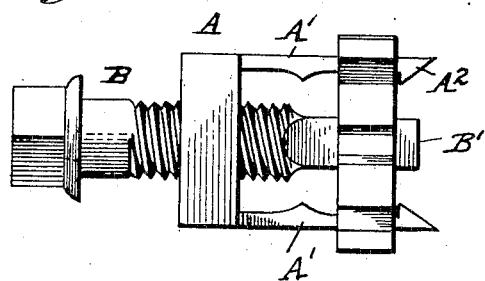
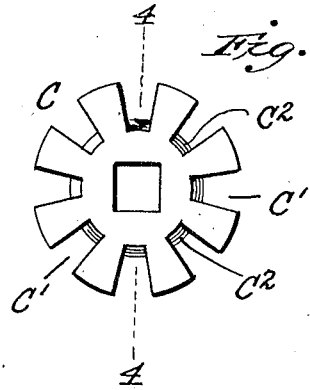
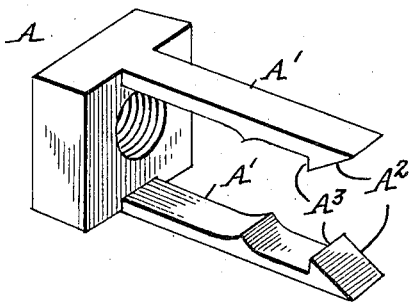
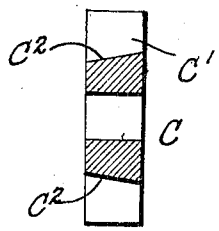
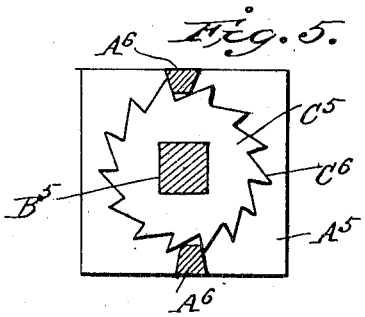
Witnesses
Edwin L. Yewell
Edwin T. Frey
Inventor
Luther M. Gilchrist
By Grant Burroughs
Attorney
THE NORRIS PETERS CO., WASHINGTON, D. C.

UNITED STATES PATENT OFFICE.

LUTHER M. GILCHRIST, OF CASEYVILLE, KENTUCKY, ASSIGNOR, BY DIRECT AND MESNE ASSIGNMENTS, OF ONE-EIGHTH TO JAMES L. AMES, ONE-FOURTH TO JOHN F. BUCKHAM, ONE-SIXTEENTH TO JOSEPH A. REDICK, AND ONE-SIXTEENTH TO JOHN P. WINSTON, OF CASEYVILLE, KENTUCKY.

NUT-LOCK.

No. 844,589.　　　　Specification of Letters Patent.　　　　Patented Feb. 19, 1907.

Application filed April 23, 1906. Serial No. 313,251.

*To all whom it may concern:*

Be it known that I, LUTHER M. GILCHRIST, a citizen of the United States, and a resident of Caseyville, in the county of Union and State of Kentucky, have invented certain new and useful Improvements in Nut-Locks, of which the following is a full, clear, and exact description, such as will enable those skilled in the art to which it appertains to make and use the same, reference being had to the accompanying drawings, forming a part of this specification.

In machine construction it is often necessary to provide means for securing a nut upon the end of a rod to hold it against accidental displacement and which at the same time will permit a speedy removal of the nut. The invention in the present instance has this object in view. The invention is also applicable to ordinary nut-lock construction.

The invention consists in the novel construction, combination, and arrangement of parts, such as will be hereinafter fully described, pointed out in the appended claims, and illustrated in the accompanying drawings.

In the drawings, in which similar reference characters designate corresponding parts, Figure 1 is a plan view of a device embodying the invention. Fig. 2 is a detail perspective view of the nut. Fig. 3 is a plan view of the holding-plate. Fig. 4 is a cross-sectional view on the line 4 4 of Fig. 3. Fig. 5 is a cross-sectional view of a modification of the invention.

Projecting from opposite sides of the nut A are the spring-arms A′, which extend parallel with the rod or bolt B when the parts are assembled. On the inner sides of the free ends of the arms are the cam-faces $A^2$, and adjacent to the latter are the catches $A^3$. The end of the rod or bolt B is reduced in size and has a rectangular shape, as at B′, and on it fits the circular holding-plate C, provided with a plurality of recesses C′ in its periphery. These recesses are shaped to fit the spring-arms A′, and their bottoms, as at $C^2$, are beveled to form bearings for the cam-faces $A^2$. The reduced end B′ of the bolt permits the nut A to pass over the same.

In assembling the parts the nut is turned onto the rod or bolt the desired distance, and the holding-plate C is then placed on the end of the rod. Should the recesses C′ not register exactly with the ends of the spring-arms, then the nut is slightly turned either way until there is a registration. After the recesses and arms register the plate is forced between the arms. The beveled bottoms $C^2$ of the recesses bearing on the cam-faces $A^2$ will force the arms apart. The plate is forced between the arms until the catches $A^3$ pass outside of the plate and spring back over the edge of the same. By this means the plate is held in place on the outer end of the rod by the catches on the arms, and as the plate cannot turn on the rod it will hold the nut against rotation through the engagement of the spring-arms with the recesses in the periphery of the plate.

While the end of the rod or bolt is described as being rectangular, yet it may have any polygonal shape to prevent the turning of the holding-plate. There are eight recesses shown in the periphery of the holding-plate, which number has been found sufficient for most practical purposes. If a more accurate adjustment of the nut is required, so that it need not be turned but very little on the rod to secure a registration of the spring-arms with the recesses in the holding-plate, then the number of recesses can be increased to meet the requirements.

In Fig. 5 a modification of the device is shown. Here the nut $A^5$ and the bolt or rod $B^5$ have substantially the same construction as in the first instance. The holding-plate $C^5$ has ratchet-teeth $C^6$ in its periphery instead of the recesses in the first instance. These teeth will permit the nut to be turned in one direction onto the rod, but will prevent it from being turned off in the opposite direction, as the teeth and spring-arms $A^6$ form a pawl-and-ratchet mechanism. In other respects the two devices are the same. Other modifications might be described.

Having thus described my invention, what I claim, and desire to secure by Letters Patent, is—

1. In a nut-lock, a screw-threaded bolt having a reduced polygonal-shaped end, a nut turned onto said bolt, a holding-plate fitting the reduced polygonal-shaped end of the bolt and movable thereon lengthwise of the bolt and provided with recesses in its periphery, and spring-arms on said nut to engage the recesses in said plate.

2. In a nut-lock, a screw-threaded bolt having a reduced polygonal-shaped end, a nut turned onto said bolt, a holding-plate fitting the reduced polygonal-shaped end of the bolt and movable thereon lengthwise of the bolt and provided with recesses having beveled bottoms, spring-arms on said nut to engage with the recesses in said plate, cam-faces on the ends of said arms to engage the beveled bottoms of the recesses in said plate, and catches on said arms to engage said plate.

In testimony whereof I hereunto affix my signature in the presence of two witnesses.

LUTHER M. GILCHRIST.

Witnesses:
C. A. GILCHRIST,
W. A. WELLS.